United States Patent
Alameh

(10) Patent No.: US 10,397,394 B1
(45) Date of Patent: Aug. 27, 2019

(54) ELECTRONIC DEVICE WITH ADJUSTABLE DEPTH IMAGER AND CORRESPONDING METHODS

(71) Applicant: Motorola Mobility LLC, Chicago, IL (US)

(72) Inventor: Rachid Alameh, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/957,713

(22) Filed: Apr. 19, 2018

(51) Int. Cl.
*H04M 1/725* (2006.01)
*G06F 1/16* (2006.01)
*G06F 3/01* (2006.01)
*G06F 3/16* (2006.01)

(52) U.S. Cl.
CPC ...... *H04M 1/72569* (2013.01); *G06F 1/1643* (2013.01); *G06F 3/017* (2013.01); *G06F 3/167* (2013.01)

(58) Field of Classification Search
CPC .. H04M 1/72569; G06F 1/1643; G06F 3/167; G06F 3/017
See application file for complete search history.

(56) References Cited

U.S. PATENT DOCUMENTS

| | | | |
|---|---|---|---|
| 9,489,172 B2 | 11/2016 | Iyer et al. | |
| 9,754,588 B2 | 9/2017 | Iyer et al. | |
| 9,860,517 B1* | 1/2018 | Ramaswamy | ..... H04N 5/23241 |
| 10,101,819 B2* | 10/2018 | Trattler | ................. G06F 1/3231 |
| 2012/0208601 A1* | 8/2012 | Lockwood | ........ H04W 52/0254 455/566 |
| 2016/0252963 A1 | 9/2016 | Elkins et al. | |
| 2017/0124383 A1* | 5/2017 | Ohbitsu | .................... G06T 7/74 |

OTHER PUBLICATIONS

Alameh, Rachid et al., "Method and Devices for Authenticating a User by Image, Depth, and Thermal Detection", U.S. Appl. No. 15/795,076, filed Oct. 26, 2017.

\* cited by examiner

*Primary Examiner* — Marcos L Torres
(74) *Attorney, Agent, or Firm* — Phillip H. Burrus, IV

(57) ABSTRACT

An electronic device includes a wireless communication circuit, a three-dimensional imager, and one or more processors operable with the three-dimensional imager. The one or more processors can detect, with the wireless communication circuit, receiving or transmitting an electronic communication. The one or more processors can also detect, with one or more sensors, an object located within a first distance the electronic device. The one or more processors can thereafter transition the three-dimensional imager from a high-power mode of operation to a low-power mode of operation.

20 Claims, 7 Drawing Sheets

ELECTRONIC DEVICE WITH ADJUSTABLE DEPTH IMAGER AND CORRESPONDING METHODS

BACKGROUND

Technical Field

This disclosure relates generally to electronic devices, and more particularly to wireless communication electronic devices.

Background Art

Portable electronic devices, including smartphones, tablet computers, and the like, are used by millions of people. The owners of these devices use them to communicate with others, whether via voice communications or text or multimedia communications, as well as for managing their everyday lives. Such devices are used to manage financial records, health data and records, for recreation, of entertainment, and a host of other purposes.

One issue continually beleaguering designers is battery capacity and overall device run time. Consumers desire smaller and smaller devices. At the same time, they want these devices to run a full day or more on a single charge of the energy storage device. The fact that these devices are used for so many purposes and functions means that their processors are perpetually operational, thereby further taxing the energy storage device. It would be advantageous to have an improved electronic device with features that extend device run time.

Figure 1:
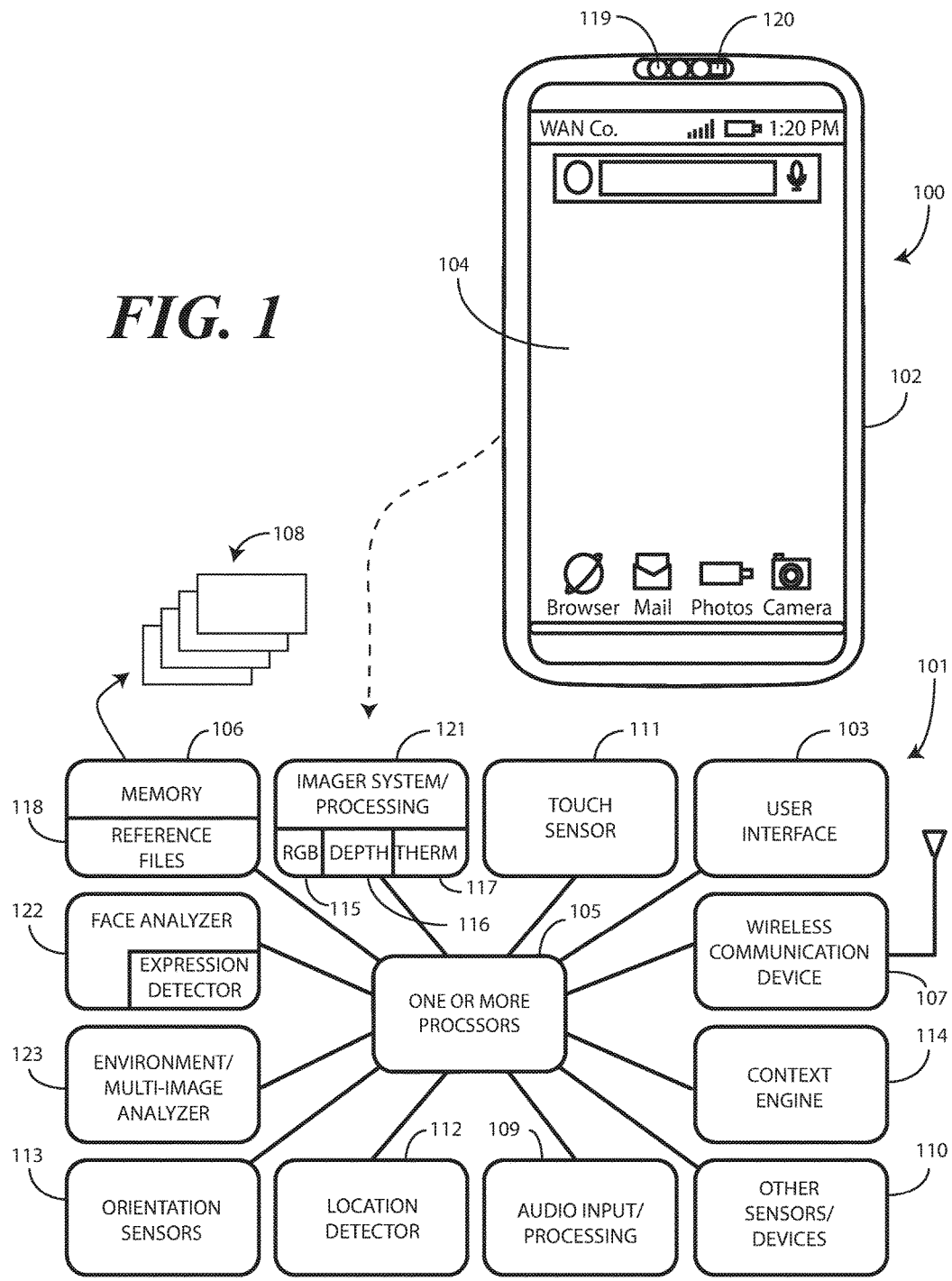
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to utilizing a signal emitter of a depth imager as a proximity sensor when certain conditions are precedent. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of causing a signal emitter of a depth imager to reduce a transmission distance from a first transmission range to a second transmission range to be used as a proximity detector, rather than a depth imager, as described herein. The non-processor circuits may include, but are not limited to, a radio receiver, a radio transmitter, signal drivers, clock circuits, power source circuits, and user input devices. As such, these functions may be interpreted as steps of a method to perform changes in transmission distance from a first transmission range, where depth scans can be performed, to a second transmission range, where proximity to an electronic device can be determined. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device that includes a depth imager. In accordance with one or more embodiments of the disclosure, the depth imager can be used in one of two modes of operation. In a first mode of operation, the depth imager functions as a time of flight device to create a three-dimensional map an object, such as a user's face, for authentication or identification. In a second mode of operation, a signal emitter of the depth imager is altered so as to reduce a transmission distance from a first transmission distance range to a second transmission range. When operating in the second mode of operation, the depth imager no longer creates three-dimensional maps. Instead, due to the fact that the signal emitter has reduced its transmission distance to the second transmission range, it acts as a proximity sensor that merely detects the proximity of an object to the electronic device.

This change in transmission distance advantageously can be used to conserve power and extend the overall run time of an electronic device. Illustrating by example, in one embodiment one or more processors of the electronic device detect an electronic communication operation occurring. For instance, the one or more processors may detect an incoming voice communication to a smartphone. When this occurs, a user may reach for the electronic device. The depth imager, operating with a transmission distance of a first transmission range, detects the object (hand, arm, etc.) within a first distance of the electronic device.

When both the electronic communication operation is occurring and the object is located within the first distance of the electronic device, in one or more embodiments the one or more processors cause a signal emitter of the depth imager of the electronic device to reduce a transmission distance from a first transmission range to a second transmission range. In one or more embodiments, the one or more processors also disable a touch sensor of a touch-sensitive display of the electronic device. Optionally, the one or more processors can disable the display as well, e.g., cease presenting visual output on the display.

This combination of reducing the transmission distance, disabling a touch sensor and ceasing the presentation of visual output on the display saves power while, for example, the user is engaged in the voice call. Moreover, the reduction of the transmission distance advantageously allows the depth imager to be used as a proximity detector detecting, for example, the user's face against, or near, the electronic device. As such, the disabling of the touch sensor and the cessation of the presentation of visual output can continue as long as the depth imager, operating as a proximity detector, continues to detect the presence of the user's face against, or near, the electronic device. When the communication operation terminates, and the user removes the electronic device from their ear, the one or more processors can cause the signal emitter of the depth imager to return its transmission distance to the first transmission range to again function as a depth imager.

Additional operations can occur as well. For example, in one or more embodiments a motion detector can detect motion of the electronic device. An imager can capture images. These additional sensor detections can be used in conjunction with the detection of the electronic communication operation and the object being located within a first distance of the electronic device to extend electronic device run time as well.

For instance, in one example, when an electronic device is in a dialing or call-receiving mode, and the depth imager detects that a user is approaching the device, additional sensors can capture additional data. The motion detector may detect the user grabbing the electronic device and moving it toward their head. The imager may begin capturing images to confirm that a side view of the user's face or ear can be seen or getting closer. These additional measurements help to confirm that the user is actually placing the electronic device near their head, which in turns means that the display will not need to be illuminated or present data, and further means that the touch sensor will not be required. Thus, in one or more embodiments when the device is receiving a communication, a depth imager detects an approaching object, a motion sensor detects motion, and an imager captures a side view of a user's face, one or more processors of the electronic device can cause the signal emitter of the depth imager of the electronic crevice to reduce its transmission distance from the first transmission range to the second transmission range. The depth imager can then be used as a proximity sensor.

When the depth imager, operating as a proximity sensor, detects the user's face within a predefined distance of the electronic device, such as less than two inches, in one or more embodiments the one or more processors will disable the display and its corresponding touch sensor. The display, touchscreen, and other components can gradually change functionality as the electronic device approaches a user's head. For example, these feature changes may begin occurring when the electronic device is, say, six inches from the user's head. Examples of such feather changes include the display dimming, then turning OFF, or audio getting lower in volume, and so forth.

Once the call ends, i.e., the electronic communication operation ceases, and the electronic device separates from the face by another predefined distance (which can be established to define a hysteresis action) the signal emitter of the depth imager reverts back to "high power," which means that its transmission distance returns to the first transmission range from the second transmission range. In one or more embodiments, between the two transitions (in and out), the electronic device is presumed to be touching—or near—the user's face even if the imager is blocked and cannot see the side view of the user's face or ear. This presumption continues, in one or more embodiments, until the depth imager, operating as a proximity sensor, detects removal of the electronic device from the face. Said differently, even if the electronic device is touching the user's face and one or both of the imager or depth imager is blocked, the one or more processors will presume that the electronic device is against the user's face until a separation by a predetermined amount is detected.

Accordingly, embodiments of the disclosure are operable to detect an electronic communication operation context, one example of which is an incoming voice communication.

Embodiments of the disclosure can then detect pre-placement of the electronic device against the face of the user. As noted, this can be detected using motion detection, images, and depth measurements. Where placement of the electronic device against—or near—the face occurs, the one or more processors can disable the touch sensor and/or display presentation function.

The transmission distance of the depth imager can also switch between the first transmission range and the second transmission range with hysteresis. In one or more embodiments, this occurs with hysteresis. For example, when the electronic device comes within one and a half inches of the user's face, in one or more embodiments the signal emitter of the depth imager switches from the first transmission range to the second transmission range. However, when the electronic device separates from the user's face, it may need to move a second distance, different from the first, such as about two and a half inches, for the one or more processors to cause the signal emitter to transition from the second transmission range to the first transmission range. Other operations will be described below. Still others will be obvious to those of ordinary skill in the art having the benefit of this disclosure. In one or more embodiments, the imager can detect skin tone color, which can impact source absorption of laser or infrared pulses emitted by the depth imager. This additional information can further be used in calibrating and/or setting the right amount of depth imager source power when the electronic device is about to reach the face of a user.

Turning now to FIG. 1 illustrated therein is one explanatory block diagram schematic 101 of one explanatory electronic device 100 configured in accordance with one or more embodiments of the disclosure. The electronic device 100 can be one of various types of devices. In one embodiment, the electronic device 100 is a portable electronic device, one example of which is a smartphone that will be used in the figures for illustrative purposes. However, it should be obvious to those of ordinary skill in the art having the benefit of this disclosure that the block diagram schematic 101 could be used with other devices as well, including palm-top computers, tablet computers, gaming devices, media players, wearable devices, or other portable wireless communication devices. Still other devices will be obvious to those of ordinary skill in the art having the benefit of this disclosure.

In one or more embodiments, the block diagram schematic 101 is configured as a printed circuit board assembly disposed within a housing 102 of the electronic device 100. Various components can be electrically coupled together by conductors or a bus disposed along one or more printed circuit boards.

The illustrative block diagram schematic 101 of FIG. 1 includes many different components. Embodiments of the disclosure contemplate that the number and arrangement of such components can change depending on the particular application. Accordingly, electronic devices configured in accordance with embodiments of the disclosure can include some components that are not shown in FIG. 1, and other components that are shown may not be needed and can therefore be omitted.

The illustrative block diagram schematic 101 includes a user interface 103. In one or more embodiments, the user interface 103 includes a display 104, which may optionally be touch-sensitive. In one embodiment, users can deliver user input to the display 104 of such an embodiment by delivering touch input from a finger, stylus, or other objects disposed proximately with the display 104. In one embodiment, the display 104 is configured as an active matrix organic light emitting diode (AMOLED) display. However, it should be noted that other types of displays, including liquid crystal displays, suitable for use with the user interface 103 would be obvious to those of ordinary skill in the art having the benefit of this disclosure.

In one embodiment, the electronic device includes one or more processors 105. In one embodiment, the one or more processors 105 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the block diagram schematic 101. Each of the application processor and the auxiliary processor(s) can be configured to process and execute executable software code to perform the various functions of the electronic device with which the block diagram schematic 101 operates. A storage device, such as memory 106, can optionally store the executable software code used by the one or more processors 105 during operation.

In this illustrative embodiment, the block diagram schematic 101 also includes a wireless communication circuit 107 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks. The wireless communication circuit 107 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The wireless communication circuit 107 can include wireless communication circuitry, one of a receiver, a transmitter, or transceiver, and one or more antennas.

In one embodiment, the one or more processors 105 can be responsible for performing the primary functions of the electronic device with which the block diagram schematic 101 is operational. For example, in one embodiment the one or more processors 105 comprise one or more circuits operable with the user interface 103 to present presentation information to a user. The executable software code used by the one or more processors 105 can be configured as one or more modules 108 that are operable with the one or more processors 105. Such modules 108 can store instructions, control algorithms, and so forth.

In one or more embodiments, the block diagram schematic 101 includes an audio input/processor 109. The audio input/processor 109 can include hardware, executable code, and speech monitor executable code in one embodiment. The audio input/processor 109 can include, stored in memory 106, basic speech models, trained speech models, or other modules that are used by the audio input/processor 109 to receive and identify voice commands that are received with audio input captured by an audio capture device. In one embodiment, the audio input/processor 109 can include a voice recognition engine. Regardless of the specific implementation utilized in the various embodiments, the audio input/processor 109 can access various speech models to identify speech commands.

In one embodiment, the audio input/processor 109 is configured to implement a voice control feature that allows a user to speak a specific device command to cause the one or more processors 105 to execute a control operation. For example, the user may say, "Authenticate Me Now." This statement comprises a device command requesting the one or more processors to cooperate with the authentication system 121 to authenticate a user. Consequently, this device command can cause the one or more processors 105 to access the authentication system 121 and begin the authentication process. In short, in one embodiment the audio input/processor 109 listens for voice commands, processes the commands and, in conjunction with the one or more processors 105, performs a touch-less authentication procedure in response to voice input.

Various sensors can be operable with the one or more processors 105. FIG. 1 illustrates several examples such sensors. It should be noted that those shown in FIG. 1 are not comprehensive, as others will be obvious to those of ordinary skill in the art having the benefit of this disclosure. Additionally, it should be noted that the various sensors shown in FIG. 1 could be used alone or in combination. Accordingly, many electronic devices will employ only subsets of the sensors shown in FIG. 1, with the particular subset defined by device application.

A first example of a sensor that can be included with the electronic device 100 is a touch sensor 111. The touch sensor 111 can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors 105, to detect an object in close proximity with—or touching—the surface of the display 104 or the housing 102 of an electronic device 100 by establishing electric field lines between pairs of capacitive sensors and then detecting perturbations of those field lines.

The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Further, it is capable of being deposited in thin layers by way of a printing process. The capacitive sensors may also be deposited on the substrate by electron beam evaporation, physical vapor deposition, or other various sputter deposition techniques.

Another example of a sensor is a geo-locator that serves as a location detector 112. In one embodiment, location detector 112 is able to determine location data when the touch-less authentication process occurs by capturing the location data from a constellation of one or more earth orbiting satellites, or from a network of terrestrial base stations to determine an approximate location. Examples of satellite positioning systems suitable for use with embodiments of the present invention include, among others, the Navigation System with Time and Range (NAVSTAR) Global Positioning Systems (GPS) in the United States of America, the Global Orbiting Navigation System (GLONASS) in Russia, and other similar satellite positioning systems. The satellite positioning systems based location fixes of the location detector 112 autonomously or with assistance from terrestrial base stations, for example those associated with a cellular communication network or other ground based network, or as part of a Differential Global Positioning System (DGPS), as is well known by those having ordinary skill in the art. The location detector 112 may also be able to determine location by locating or triangulating terrestrial base stations of a traditional cellular network, such as a CDMA network or GSM network, or from other local area networks, such as Wi-Fi networks.

One or more motion detectors can be configured as an orientation detector 113 that determines an orientation and/or movement of the electronic device 100 in three-dimensional space. Illustrating by example, the orientation detector 113 can include an accelerometer, gyroscopes, or other device to detect device orientation and/or motion of the electronic device 100. Using an accelerometer as an example, an accelerometer can be included to detect motion of the electronic device. Additionally, the accelerometer can be used to sense some of the gestures of the user, such as one talking with their hands, running, or walking.

The orientation detector 113 can determine the spatial orientation of an electronic device 100 in three-dimensional space by, for example, detecting a gravitational direction. In addition to, or instead of, an accelerometer, an electronic compass can be included to detect the spatial orientation of the electronic device relative to the earth's magnetic field. Similarly, one or more gyroscopes can be included to detect rotational orientation of the electronic device 100.

Other components 110 operable with the one or more processors 105 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 110 can optionally include a barometer operable to sense changes in air pressure due to elevation changes or differing pressures of the electronic device 100. Where included, in one embodiment the barometer includes a cantilevered mechanism made from a piezoelectric material and disposed within a chamber. The cantilevered mechanism functions as a pressure sensitive valve, bending as the pressure differential between the chamber and the environment changes. Deflection of the cantilever ceases when the pressure differential between the chamber and the environment is zero. As the cantilevered material is piezoelectric, deflection of the material can be measured with an electrical current.

The other components 110 can also optionally include a light sensor that detects changes in optical intensity, color, light, or shadow in the environment of an electronic device. This can be used to make inferences about context such as weather or colors, walls, fields, and so forth, or other cues. An infrared sensor can be used in conjunction with, or in place of, the light sensor. The infrared sensor can be configured to detect thermal emissions from an environment about the electronic device 100. Similarly, a temperature sensor can be configured to monitor temperature about an electronic device.

A context engine 114 can then operable with the various sensors to detect, infer, capture, and otherwise determine persons and actions that are occurring in an environment about the electronic device 100. For example, where included one embodiment of the context engine 114 determines assessed contexts and frameworks using adjustable algorithms of context assessment employing information, data, and events. These assessments may be learned through repetitive data analysis. Alternatively, a user may employ the user interface 103 to enter various parameters, constructs, rules, and/or paradigms that instruct or otherwise guide the context engine 114 in detecting multi-modal social cues, emotional states, moods, and other contextual information. The context engine 114 can comprise an artificial neural network or other similar technology in one or more embodiments.

In one or more embodiments, the context engine 114 is operable with the one or more processors 105. In some embodiments, the one or more processors 105 can control the context engine 114. In other embodiments, the context engine 114 can operate independently, delivering information gleaned from detecting multi-modal social cues, emotional states, moods, and other contextual information to the one or more processors 105. The context engine 114 can receive data from the various sensors. In one or more embodiments, the one or more processors 105 are configured to perform the operations of the context engine 114.

In one or more embodiments, the electronic device 100 includes an imager 115. In one embodiment, the imager 115 comprises a two-dimensional imager configured to receive at least one image of a person within an environment of the electronic device 100. In one embodiment, the imager 115 comprises a two-dimensional Red-Green-Blue (RGB) imager. In another embodiment, the imager 115 comprises an infrared imager. Other types of imagers suitable for use as the imager 115 of the authentication system will be obvious to those of ordinary skill in the art having the benefit of this disclosure.

In one or more embodiments, the imager 115 is operable to capture at least one image of an object situated within a predefined radius of the electronic device 100. In one embodiment, the imager 115 captures a single image of the object. In another embodiment, the imager 115 captures a plurality of images of the object. In one or more embodiments, the one or more images are each a two-dimensional image. For example, in one embodiment the image is a two-dimensional RGB image. In another embodiment, the image is a two-dimensional infrared image. Other types of two-dimensional images will be obvious to those of ordinary skill in the art having the benefit of this disclosure.

In one or more embodiments, the images captured by the imager 115 can be compared to one or more predefined reference files 118 stored in the memory 106. By making such a comparison, one or more processors 105 can confirm whether the shape, skin tone, eye color, hair color, hair length, and other features identifiable in a two-dimensional image are that of an authorized user identified by the one or more predefined reference images stored in the predefined reference files 118.

In addition to the imager 115, in one or more embodiments the electronic device 100 includes a depth imager 116. In one or more embodiments, the imager 115 can detect skin tone color, which can impact source absorption of laser or infrared pulses emitted by the depth imager 116. This additional information can further be used in calibrating and/or setting the right amount of depth imager source power when the electronic device 100 is about to reach the face of a user.

In this illustrative embodiment, the depth imager 116 comprises a time of flight device having a signal emitter 119 and a signal receiver 120. In another embodiment, the depth imager 116 employs a structured light laser or infrared light device. The structured light laser projects tiny light patterns that expand with distance. These patterns land on a surface, such as a user's face, and are then captured by an imager. By determining the location and spacing between the elements of the pattern, three-dimensional mapping can be obtained.

In this illustrative embodiment, the signal emitter 119 of the time of flight three-dimensional sensor emits laser or infrared pulses from a photodiode array. These pulses reflect back from a surface, such as the user's face, to the signal receiver 120. The time it takes for pulses to move from the photodiode array to the surface and back to the signal receiver 120 determines distance. From this, a three-dimensional mapping of a surface can be obtained. Accordingly, the use of a depth imager 116 adds a third "z-dimension" to the x-dimension and y-dimension defining the two-dimensional image captured by the imager 115. This three-dimensional aspect can enhance, for example, the security of using a person's face as their password in the process of authentication by facial recognition.

In one or more embodiments the distance that a laser or infrared pulse can be emitted by the signal emitter 119, reflected form a surface, and reliably received by the signal emitter 119 can be varied by controlling the output power of the photodiode array. As will be explained in more detail below, In one or more embodiments the power delivered to, or emitted by, the signal emitter 119 can be controlled such that the laser or infrared pulses have a "transmission distance," i.e., the distance that a laser or infrared pulse can be emitted by the signal emitter 119, reflected form a surface, and reliably received by the signal emitter 119, that can be changed between a first transmission range and a second transmission range. In one or more embodiments, the second transmission range is shorter than the first transmission range. For instance, the first transmission range may be on the order of about a meter, while the second transmission range is on the order of five to ten centimeters.

Accordingly, the one or more processors 105 can cause the signal emitter 119 of the depth imager 116 to operate at a first "effective" transmission range so that the signal receiver 120 can reliably receive the laser pulse or infrared pulse emissions from a first distance. Similarly, the one or more processors 105 can cause the signal emitter 119 of the depth imager 116 to operate at a second effective transmission range, which is less than the first transmission range, so that the signal receiver 120 can reliably receive the laser pulse or infrared pulse emissions from a second distance, which is less than the first distance. The transmission range difference allows the one or more processors 105 to interpret readings from the depth imager 116 differently.

When operating at the first transmission range, the depth imager 116 performs a three-dimensional mapping function. Illustrating by example, in one or more embodiments the depth imager 116 captures at least one depth scan of an object when situated within the predefined radius of the electronic device 100. In one embodiment, the depth imager 116 captures a single depth scan of the object. In another embodiment, the depth imager 116 captures a plurality of depth scans of the object. These depth scans creates a depth map of a three-dimensional object, such as the user's face. This depth map can then be compared to one or more predefined reference files 118 stored in the memory 106 to confirm whether the contours, nooks, crannies, curvatures, and features of the user's face are that of the authorized user identified by the one or more predefined reference files 118.

When operating at the second transmission range, the depth imager 116 no longer performs this function due to its reduced transmission distance of the signal emitter 119. Instead, the depth imager 116 operates as a proximity sensor. More particularly, the depth imager 116 operates as an "active" proximity sensor in that it includes both a signal emitter 119 and a signal receiver 120. The proximity sensor can compute the distance to any nearby object from characteristics associated with the reflected signals. The reflected signals are detected by the corresponding signal receiver 120, which may be an infrared photodiode used to detect reflected signals, respond to modulated infrared signals, and/or perform triangulation of received infrared signals.

Advantageously, the ability to drive the signal emitter 119 of the depth imager 116 at varying power levels allows the one or more processors 105 to quickly and simply transition the functionality of the depth imager 116 from that of three-dimensional scanner to proximity sensor. Advantageously, in one or more embodiments the electronic device 100 does not require any additional proximity detection devices. The depth imager 116 can be used for authentication and other purposes at large distances, while detecting proximity of an object to the electronic device at closer distances. This duality of function is achieved by driving, for example, the signal emitter 119 a higher power while performing three-dimensional mapping, and at lower power when detecting proximity input.

The electronic device 100 can include a thermal sensor 117. The thermal sensor 117 can take various forms. In one embodiment, the thermal sensor 117 is simply a proximity sensor component. In another embodiment, the thermal sensor 117 comprises a simple thermopile. In another embodiment, the thermal sensor 117 comprises an infrared imager that captures the amount of thermal energy emitted by an object. Other types of thermal detectors 112 will be obvious to those of ordinary skill in the art having the benefit of this disclosure.

When operating the signal emitter 119 of the depth imager 116 with a transmission distance of the first transmission range, the depth imager 116 can be used in combination with the imager 115, and optionally the thermal sensor 117, as an authentication device. Illustrating my example, in one or more embodiments one or more processors 105 compare the images captured by the imager 115 with the one or more predefined reference files 118, e.g., reference images, stored in memory 106. The one or more processors 105 can then compare depth scans created by the depth imager 116 with other predefined reference files 118, e.g., facial maps, stored in the memory 106.

In one or more embodiments, a touch-less authentication of a user will fail unless the images sufficiently correspond to at least one of the one or more predefined images and the depth scans sufficiently correspond to at least one of the one or more predefined facial maps. As used herein, "sufficiently" means within a predefined threshold. For example, if one of the predefined images includes five hundred reference features, such as facial shape, nose shape, eye color, background image, hair color, skin color, and so forth, the images will sufficiently correspond to at least one of the one or more predefined images when a certain number of features in the images are also present in the predefined images. This number can be set to correspond to the level of security desired. Some users may want ninety percent of the reference features to match, while other users will be content if only eighty percent of the reference features match, and so forth.

As with the predefined images, the depth scans will sufficiently match the one or more predefined facial maps when a predefined threshold of reference features in one of the facial maps is met. In contrast to two-dimensional features found in the one or more predefined images, the one or more predefined facial maps will include three-dimensional reference features, such as facial shape, nose shape, eyebrow height, lip thickness, ear size, hair length, and so forth. As before, the depth scans will sufficiently correspond to at least one of the one or more predefined facial maps when a certain number of features in the depth scans are also present in the predefined facial maps. This number can be set to correspond to the level of security desired. Some users may want ninety-five percent of the reference features to match, while other users will be content if only eighty-five percent of the reference features match, and so forth.

The use of both the images and the depth scans as combined authentication factors can be superior to using one or the other alone. The depth scans add a third "z-dimension" to the x-dimension and y-dimension data found in the images, thereby enhancing the security of using the user's face as their password in the process of authentication by facial recognition. Another benefit of using the depth scans in conjunction with the images is the prevention of someone "faking" the imager 115 acting alone by taking an image of a photograph of an authorized user, rather than the user themself. Illustrating by example, if only the imager 115 is used, a nefarious person trying to get unauthorized access to the electronic device 100 may simply snap a picture of a two-dimensional photograph of the user. The use of a depth scan in conjunction with the image prevents this type of chicanery by requiring that a three-dimensional object, i.e., the actual user, be present and within the predefined radius of the electronic device 100 before an authentication system 121 authenticates the user.

The authentication system 121 can be operable with a face analyzer 122 and an environmental analyzer 123. The face analyzer 122 and/or environmental analyzer 123 can be configured to process an image or depth scan of an object and determine whether the object matches predetermined criteria. For example, the face analyzer 122 and/or environmental analyzer 123 can operate as an identification module configured with optical and/or spatial recognition to identify objects using image recognition, character recognition, visual recognition, facial recognition, color recognition, shape recognition, and the like. Advantageously, the face analyzer 122 and/or environmental analyzer 123, operating in tandem with the authentication system 121, can be used as a facial recognition device to determine the identity of one or more persons detected about the electronic device 100.

Illustrating by example, in one embodiment when the authentication system 121 detects a person, one or both of the imager 115 and/or the depth imager 116 can capture a photograph and/or depth scan of that person. The authentication system 121 can then compare the image and/or depth scan to one or more predefined reference files 118 stored in the memory 106. This comparison, in one or more embodiments, is used to confirm beyond a threshold authenticity probability that the person's face—both in the image and the depth scan—sufficiently matches one or more of the reference files.

Beneficially, this optical recognition performed by the authentication system 121 operating in conjunction with the face analyzer 122 and/or environmental analyzer 123 allows access to the electronic device 100 only when one of the persons detected about the electronic device are sufficiently identified as the owner of the electronic device 100. Accordingly, in one or more embodiments the one or more processors 105, working with the authentication system 121 and the face analyzer 122 and/or environmental analyzer 123 can determine whether at least one image captured by the imager 115 matches a first predefined criterion, whether at least one facial depth scan captured by the depth imager 116 matches a second predefined criterion, and whether the thermal energy identified by the thermal sensor 117 matches a third predefined criterion, with the first criterion, second criterion, and third criterion being defined by the predefined reference files 118 and predefined temperature range. The first criterion may be a skin color, eye color, and hair color, while the second criterion is a predefined facial shape, ear size, and nose size. The third criterion may be a temperature range of between 95 and 101 degrees Fahrenheit. In one or more embodiments, the one or more processors 105 authenticate a person as an authorized user of the electronic device when the at least one image matches the first predefined criterion, the at least one facial depth scan matches the second predefined criterion, and the thermal energy matches the third predefined criterion.

In one or more embodiments, the face analyzer 122 and/or environmental analyzer 123 is configured to identify an expressed mien from at least one image and/or at least one facial depth scan. In one embodiment, authentication occurs only when the expressed mien matches a fourth predefined criterion. As noted above, examples of expressed miens include one of one or more raised eyebrows, one or more closed eyes, one or more fingers touching a face, an opened mouth, looking up, looking down, looking to the right, looking to the left, or being situated adjacent to a predefined object. As such, in one or more embodiments the one or more processors 105 authenticate a person as an authorized user of the electronic device when the at least one image matches the first predefined criterion, the at least one facial depth scan matches the second predefined criterion, and the thermal energy matches the third predefined criterion, and when the expressed mien matches a fourth predefined criterion.

In one or more embodiments, a user can "train" the electronic device 100 by storing predefined miens in the face analyzer 122 or reference photos in the memory 106 of the electronic device 100. Illustrating by example, a user may take a series of pictures. These can include specifically articulated miens. They can include depth looking in different directions. They can include making a sweep with the electronic device 100 such as from top to bottom or left to right about the face. They can also include identifiers of special features such as eye color, sink color, air color, weight, and height. They can include the user standing in front of a particular wall, which is identifiable by the environmental analyzer from images captured by the imager 115. They can include the user raisin a hand or looking in one direction, such as in a profile view. The miens can include raised eyebrows or one eye closed or an open mouth or a finger touching the chin. These are merely examples of items that can be stored in the reference images. Others will be readily obvious to those of ordinary skill in the art having the benefit of this disclosure. Any of these can constitute the fourth criterion from the preceding paragraph.

Additionally, the reference features can store one or more facial features, such as a bent nose, scar, mole, beard, or tattoo. Where this occurs, the face analyzer 122 can detect such facial features from images captured by the imager 115. Accordingly, in one or more embodiments the one or more processors 105 authenticate a person as an authorized user of the electronic device when the at least one image matches the first predefined criterion, the at least one facial depth scan matches the second predefined criterion, and the thermal energy matches the third predefined criterion, and one or more facial features sufficiently match one or more predefined facial features stored within the reference images in the memory 106 of the electronic device 100. With passage of time, user features can slowly change. These changes are used to update system and stored samples. For example, if the user lost a tooth, has a tattoo that is washing out, has hair that is getting grey, or other changes, the system can be updated accordingly. In one embodiment, the system is updated manually. In other embodiments, the system can automatically update after the user confirms their credentials.

Additionally, in or more embodiments the imager 115 and/or depth imager 116 is configured to capture multiple images and/or multiple depth scans. In one or more embodiments, the face analyzer 122 and/or environmental analyzer 123 is configured to detect movement of the person between the first image and the second image. As noted above, movement can include motion of the person while remaining in the same location, e.g., a change in facial expression, a touch of the cheek, a new orientation of the electronic device relative to the user, and so forth. Motion can include blinking, opening or closing the mouth, raising the eyebrows, changing posture, moving the head relative to the neck, and so forth.

Examples of movement can also include both the person moving in three-dimensional space and movement of the person's features. One example might be removing the user's glasses while walking between images or depth scans. Another example might be winking while changing the distance between the user and the electronic device 100 between images or depth scans. Still another example might be blowing out one's cheeks while stepping backwards between images or depth scans. These are illustrations only, as other examples of movement will be obvious to those of ordinary skill in the art having the benefit of this disclosure.

Movement may also include moving the electronic device 100 relative to the user between images or depth scans. For instance, a first image or depth scan may capture a frontal view of the user's face, while a second image or depth scan may then capture a profile view of the user's face. Movement may also include both the user and the electronic device 100 moving in three-dimensional space. For example, the user may capture a first image or depth scan while standing next to a tree, with a second image or depth scan being while standing next to a park bench, and so forth. As such, in one or more embodiments the one or more processors 105 authenticate a person as an authorized user of the electronic device when the at least one image matches the first predefined criterion, the at least one facial depth scan matches the second predefined criterion, and the thermal energy matches the third predefined criterion, and only when movement of a person is detected between images or depth scans.

In one or more embodiments, the face analyzer 122 can also include an image/gaze detection-processing engine. The image/gaze detection-processing engine can process information to detect a user's gaze point. The image/gaze detection-processing engine can optionally also work with the depth scans to detect an alignment of a user's head in three-dimensional space. Electronic signals can then be delivered from the imager 115 or the depth imager 116 for computing the direction of user's gaze in three-dimensional space. The image/gaze detection-processing engine can further be configured to detect a gaze cone corresponding to the detected gaze direction, which is a field of view within which the user may easily see without diverting their eyes or head from the detected gaze direction. The image/gaze detection-processing engine can be configured to alternately estimate gaze direction by inputting images representing a photograph of a selected area near or around the eyes. It can also be valuable to determine if the user wants to be authenticated by looking directly at device. The image/gaze detection-processing engine can determine not only a gazing cone but also if an eye is looking in a particular direction to confirm user intent to be authenticated.

In one or more embodiments, the face analyzer 122 is further configured to detect mood. The face analyzer 122 can infer a person's mood based upon contextual information received from the imager 115 and/or depth imager 116. For example, if a picture, a depth scan, multiple successive pictures, multiple successive depth scans, video, or other information from which a person can be identified as the owner of the electronic device 100 indicate that the owner is crying, the face analyzer 122 can infer that she is either happy or sad.

The face analyzer 122 can similarly determine emotion in one or more embodiments. Illustrating by example, a picture, a depth scan, multiple successive pictures, multiple successive depth scans, video, or other information relating to of the owner of an electronic device can allow the inference of their silently communicated emotional state, e.g. joy, anger, frustration, and so forth. This can be inferred from, for example, facial gestures such as a raised eyebrow, grin, or other feature. In one or more embodiments, such emotional cues can be used as a secret password for authentication in addition to the face.

Figure 2:
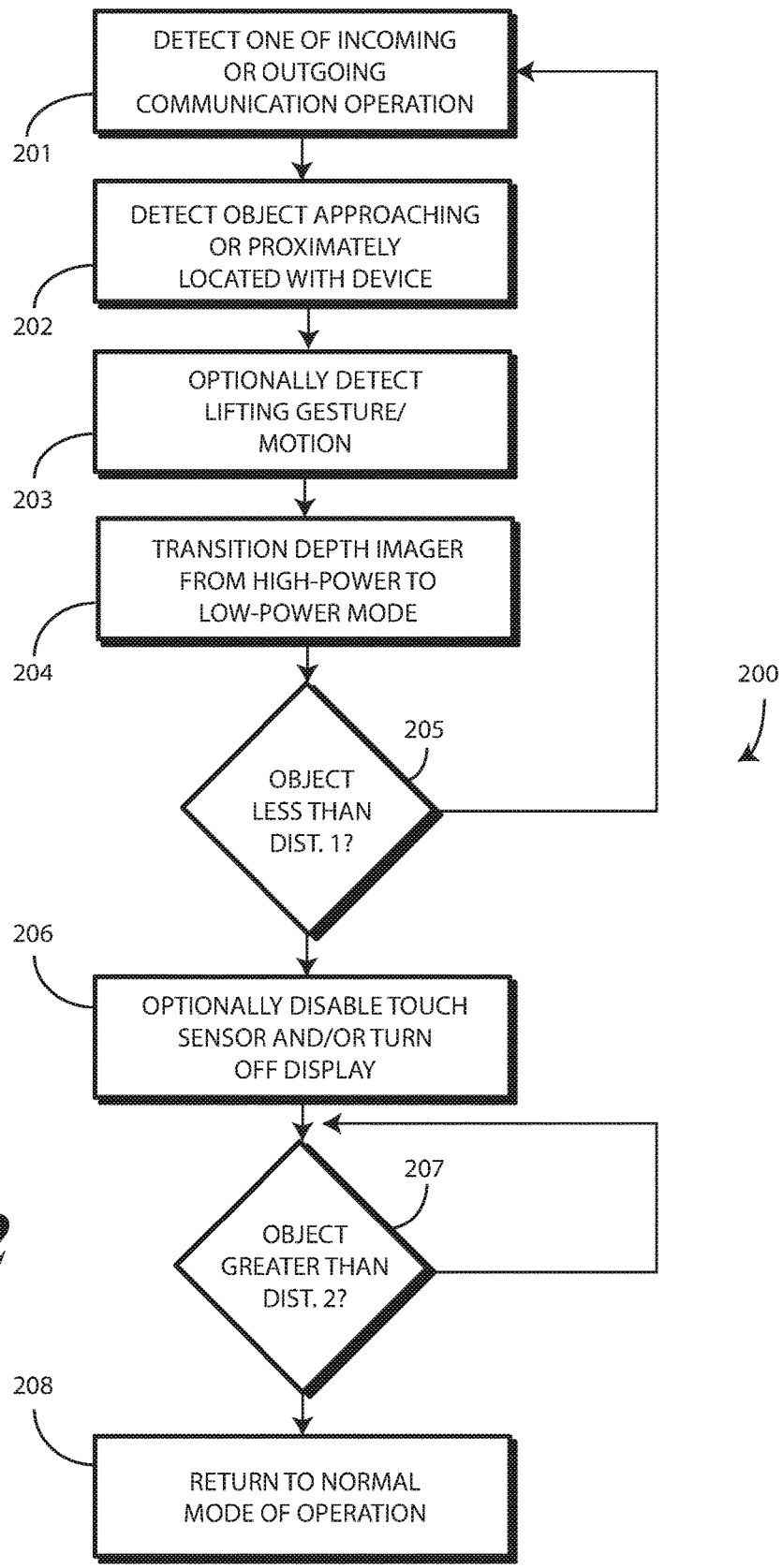
FIG. 2 illustrates one explanatory method in accordance with one or more embodiments of the disclosure.

Turning now to FIG. 2, illustrated therein is one explanatory method 200 in accordance with one or more embodiments of the disclosure. At step 201, the method 200 detects, with one or more processors of an electronic device, an electronic communication operation occurring. In one or more embodiments, the electronic communication operation comprises one of a commencement or an occurrence of one of a receipt of an incoming electronic communication or a transmission of an outgoing electronic communication. Illustrating by example, in one or more embodiments, the electronic communication operation comprises either the commencement or occurrence of the receipt of a voice communication. In another embodiment, the electronic communication operation comprises either the commencement or occurrence of the transmission of a voice communication. However, it should be understood that embodiments of the disclosure are not so limited. The communication operation could be any incoming or outgoing communication, including voice communications, text communications, multimedia communications, and so forth.

At step 202, the method 200 detects an object approaching the electronic device. In one or more embodiments, this occurs when a signal emitter of a depth imager emits laser or infrared pulses, which reflect from the object to a signal receiver. For example, if the electronic device is receiving a phone call, as detected at step 201, a user might reach for the electronic device to answer the call. In one or more embodiments, since the depth imager is operating with its signal emitter having a transmission distance within a first transmission range, e.g., five centimeters to a few meters, the depth imager will detect this object approaching the electronic device when the laser or infrared pulses reflect off the object to the signal receiver.

In one or more embodiments, step 202 can also detect an object approaching the electronic device with an imager. For example, step 202 can comprise capturing, with an imager, one or more images of the object detected by the depth imager. In one embodiment, step 202 comprises capturing a plurality of images of the object.

Step 202 can further comprise confirming, from the plurality of images, that the object is approaching the electronic device. One or more processors, for example, can confirm that the object is approaching the electronic device by detecting that the object is getting larger in each successive image.

In one or more embodiments, step 202 can comprise identifying the object as well. As noted above a face analyzer can process an image or depth scan of an object and determine whether the object matches predetermined criteria. For example, the face analyzer can operate as an identification module configured with optical and/or spatial recognition to identify objects using image recognition, character recognition, visual recognition, facial recognition, color recognition, shape recognition, and the like. Accordingly, in one or more embodiments step 202 optionally comprises identifying the object as one of a side view of a face of an authorized user or an ear of the authorized user.

In one or more embodiments, step 202 detecting skin tone color from the one or more images, which can impact source absorption of laser or infrared pulses emitted by the depth imager. This additional information can further be used in calibrating and/or setting the right amount of depth imager source power when the electronic device is about to reach the face of a user.

It should be noted that the operations performed as a function of lifting, the distance from the user, the object approaching, and so forth could occur gradually. For example, as the distance between the electronic device and the user's head decreases, rather than simply turning off the display at a particular distance, the brightness of the display can gradually decrease. Similarly, the audio volume can slowly decrease. Thus, steps such as step 206 and step 208 can occur gradually in one or more embodiments. The gradual disablement of features as the electronic device approaches the head can save additional power.

At step 203, the method 200 optionally detects, with a motion sensor, a gesture lifting the electronic device. For example, the motion sensor can detect the device moving from a first condition, e.g., lying flat on a table, to moving toward a user's head. In one or more embodiments, the one or more processors of the electronic device are operable to detect a gesture lifting the electronic device. In one embodiment, the accelerometer serves as a motion detector operable with the one or more processors. A gyroscope can then serve as another motion detector operable with the one or more processors. Where a gyroscope is not included with the electronic device, multiple accelerometers can substitute for the gyroscope to determine rotation of the electronic device about the axis. In such an embodiment, the accelerometer would serve as the motion detector while the accelerometer and another accelerometer substitute for the gyroscope. In one embodiment, when a user lifts or otherwise moves the electronic device, step 203 determines this from the motion detector. In one or more embodiments, step 203 further comprises determining an amount of rotation of the electronic device about an axis.

In one or more embodiments, step 202 and step 203 can operate in tandem. For example, where optional step 203 is included, and where step 202 includes capturing one or more images with an imager, one action can trigger the other. Illustrating by example, in one embodiment the capture of the image occurring at step 202 occurs in response to the detection of the gesture lifting the device occurring at step 203. The opposite could be true. Where optional step 203 is included, the detection of the gesture lifting the device occurring at step 203 can occur in response to the capture of the images at step 202, and so forth.

At step 204, in one or more embodiments when both the electronic communication operation is occurring, as detected at step 201, and the object is approaching the electronic device, as detected at step 202, the method 200 comprises causing a signal emitter of the depth imager of the electronic device to reduce a transmission distance from a first transmission range to a second transmission range. In one embodiment, the second transmission range is less than the first transmission range, which requires an object to be closer to the electronic device for detection. For example, while the first transmission range may be from ten inches to a yard or more, while the second transmission range may be from the surface of the electronic device to up to ten inches. These numbers are illustrative only, as other transmission ranges will be obvious to those of ordinary skill in the art having the benefit of this disclosure. As noted above, this change in transmission distance from the first transmission range to the second transmission range causes the depth imager to transition from operating in a three-dimensional mapping mode to a proximity-sensing mode.

At decision 205, the method determines, using the depth imager in the proximity-sensing mode, whether the object is within a first distance of the electronic device. In one or more embodiments, the first distance is between one and five inches. For example, the first distance may be two inches. If the object is within two inches of the electronic device, in this example, the method 200 moves to step 206. Otherwise, the method 200 returns to step 201.

At step 206, the method 200 optionally disables a touch sensor of a touch-sensitive display of the electronic device. Step 206 further optionally ceases any presentation of visual output by the display of the electronic device, which is optionally touch-sensitive. In effect, both stopping the illumination or presentation of information on the display and disabling the touch sensor of the electronic device reduces overall power consumption. This advantageously extends the run time of the electronic device.

At decision 207, the method 200 includes detecting, with the depth imager, the object moving outside a second distance from the electronic device. In one or more embodiments, the second distance is greater than the first to create hysteresis. For example, where the first distance, determined at decision 205 was two inches, the second distance detected at decision 207 is three inches. Alternatively, in another embodiment, the first distance is greater than the second distance, thereby still providing a hysteretic effect. For instance, where the first distance, determined at decision 205 was two inches, the second distance detected at decision 207 can be one inch, and so forth.

At step 208, after the object is moves outside the second distance from the electronic device as determined at decision 207, the method 200 includes returning the depth imager to its normal mode of operation. Said differently, step 208 can transition the depth imager from its proximity-sensing mode of operation to its three-dimensional mapping mode of operation.

In one embodiment, step 208 comprises causing the signal emitter of the depth imager of the electronic device to increase the transmission distance from the second transmission range to the first transmission range. Step 208 can further include causing the electronic device to return to its normal mode of operation. For example, step 208 can include turning ON or otherwise activating the touch sensor of the touch-sensitive display. Additionally, step 208 can comprise resuming the presentation of the visual output of the touch-sensitive display as well.

Figure 3:
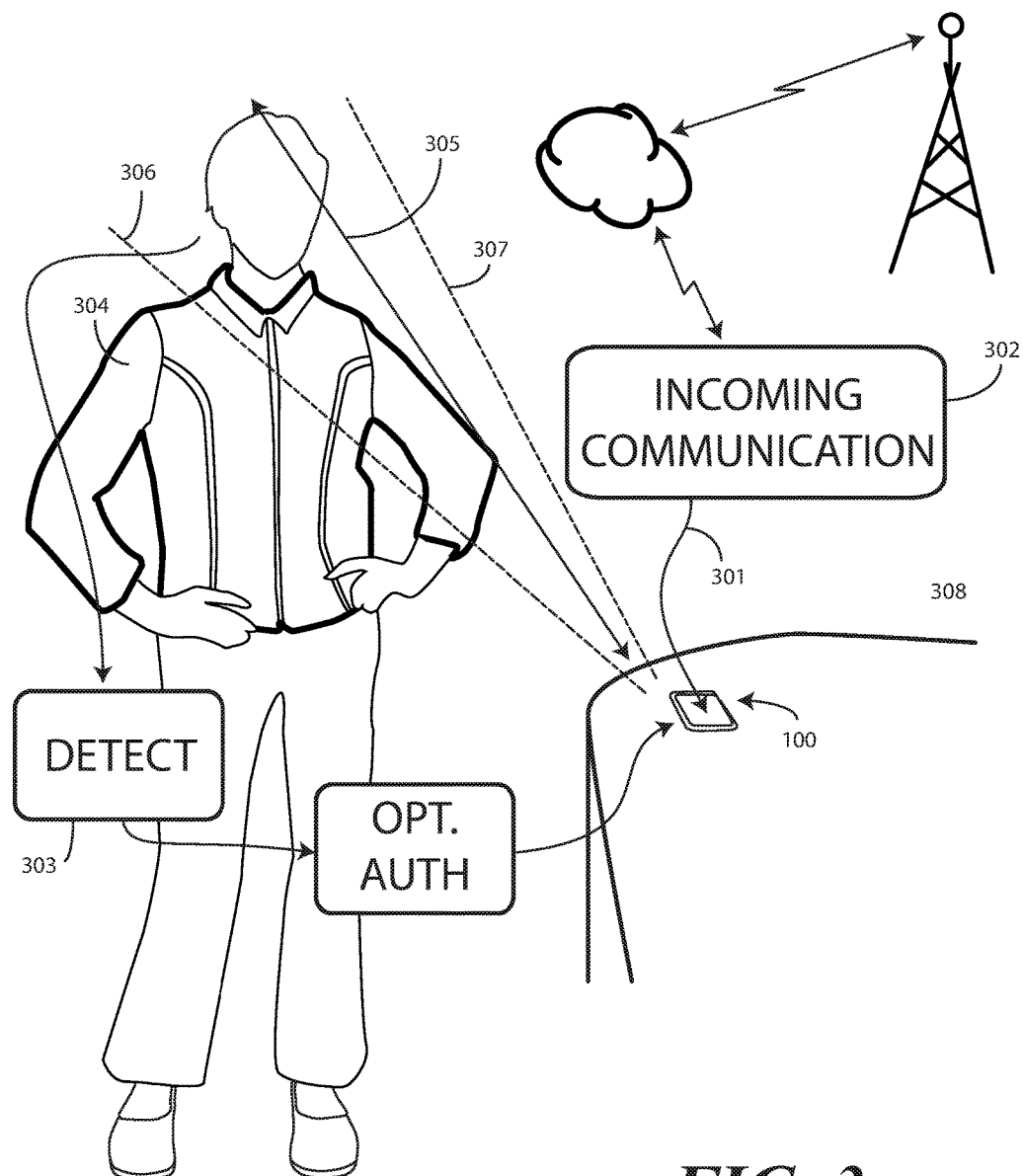
FIG. 3 illustrates one or more method steps in accordance with one or more embodiments of the disclosure.
Figure 4:
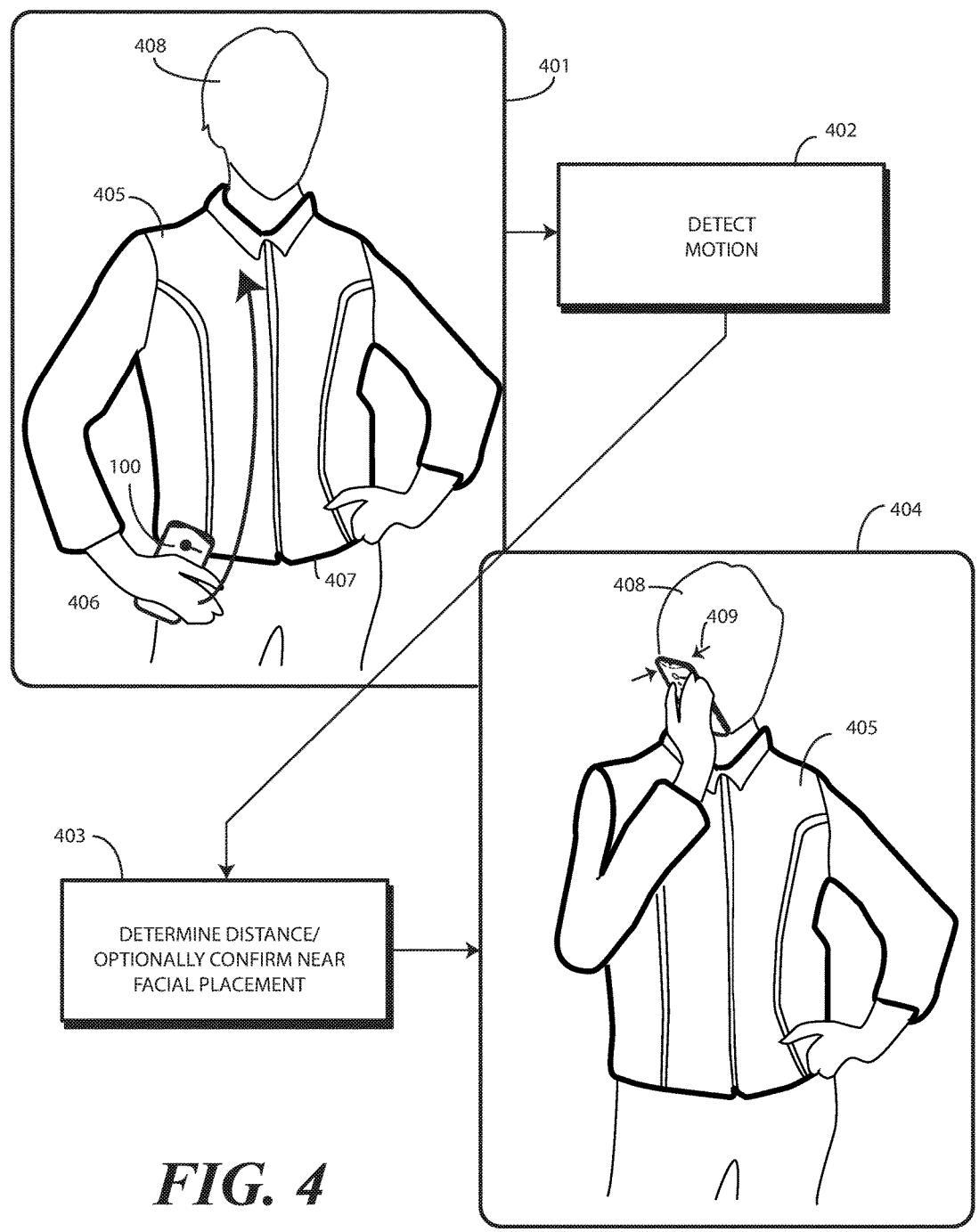
FIG. 4 illustrates one or more method steps in accordance with one or more embodiments of the disclosure.
Figure 5:
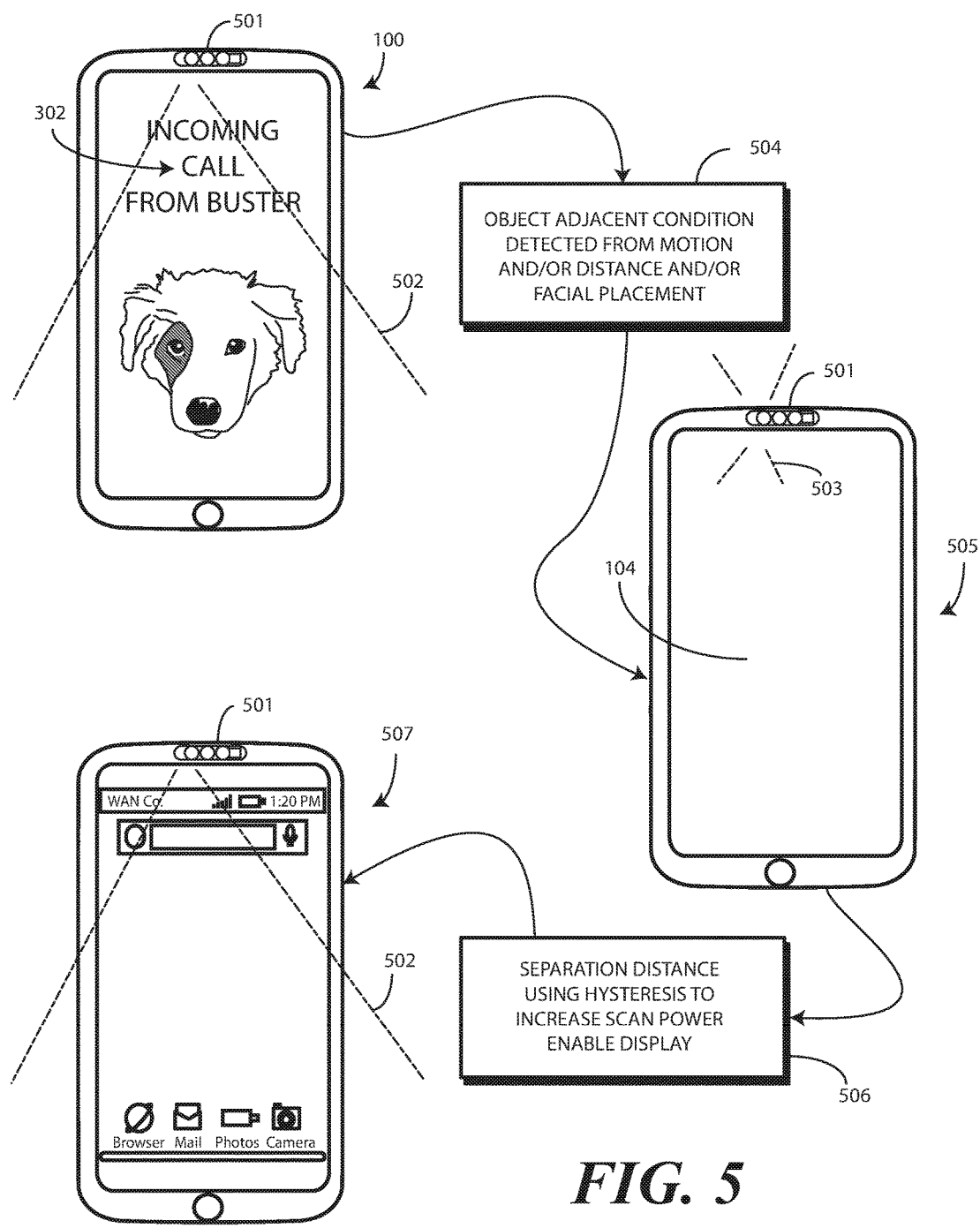
FIG. 5 illustrates one or more method steps in accordance with one or more embodiments of the disclosure.

Turning now to FIGS. 3-5, illustrated therein is an example of the method (200) of FIG. 2 being put into practice. Beginning with FIG. 3, one or more processors (105) of the electronic device 100 are detecting, with the wireless communication circuit (107), the receipt 301 of an incoming electronic communication 302. In this illustration, the incoming electronic communication 302 is a voice call being received from a remote electronic device. While FIG. 3 illustrates the detection of an incoming electronic communication 302, the detection of the transmission of an electronic communication could be detected for outgoing electronic communications in the alternative.

In one or more embodiments, when this occurs one or more sensors of the electronic device 100 then detect 303 an object 304, which in this case is an authorized user of the electronic device 100, within a first distance 305 of the electronic device. In one or more embodiments, a three-dimensional imager or depth imager (116) of the electronic device performs this detection 303 of the object 304. For example, when the one or more processors (105) of the electronic device 100 cause the three-dimensional imager to operate in a high-power mode of operation, time of flight laser or infrared pulses 306 are transmitted at least the first distance 305 where they reflect off the object 304 and return as reflected time of flight laser or infrared pulses 307 to the three-dimensional imager.

In addition to merely detecting the object 304 being within the first distance 305 of the electronic device 100, in one or more embodiments the three-dimensional imager can also detect whether the object 304 is approaching, or moving away from, the electronic device 100. Illustrating by example, the electronic device 100 is shown sitting on a table 308 in FIG. 3. Since the incoming communication 302 is a voice call, the electronic device 100 emits, in one or more embodiments, a ring tone or other alert. Since the authorized user likely wants to engage in the call, they may move a hand toward, or otherwise approach, the electronic device 100 to answer the call. In one or more embodiments, the three-dimensional imager detects this movement as a context to anticipate the fact that the authorized user is coming to answer the call.

The one or more processors (105) of the electronic device 100 may optionally authenticate the object 304 as the authorized user of the electronic device 100 as well. This authentication can occur using one or more of the three-dimensional imager, a conventional imager, a temperature sensor, or other sensors. For example, as described above, the one or more processors (105) of the electronic device 100 may authenticate the object 304 as an authorized user of the electronic device 100 when at least one image matches the first predefined criterion, at least one facial depth scan matches the second predefined criterion, and a detected thermal energy matches the third predefined criterion. Other detection factors, such as whether an expressed mien matches a fourth predefined criterion, can be used as well. Still other authentication techniques, including the use of fingerprint sensors, PIN code entry, and so forth, will be obvious to those of ordinary skill in the art having the benefit of this disclosure.

Turning now to FIG. 4, illustrated therein are alternate steps that can occur in accordance with one or more embodiments. At step 401, the object (304), i.e., the authorized user 405 in this illustration, is shown holding the electronic device 100. Accordingly, she has picked the electronic device 100 up off the table (308) and is now holding it in her hand 406. At step 401, the authorized user 405 is shown raising the electronic device 100 from her waist 407 to her head 408.

At step 402, one or more motion sensors of the electronic device 100 detect this motion. This determination can be a function of one or more factors. Explanatory factors include a distance that the electronic device 100 moves during a movement initiated by the authorized user 405, an amount of rotation of the electronic device 100 about an axis during the movement, and whether a surface of the electronic device 100 ends up proximately located with another object, such as a user's head 408, ear, or face. These latter factors can be determined at step 403. For example, in one embodiment step 403 comprises capturing, with an imager (115) of the electronic device 100, one or more images of the object. From these images, the one or more processors (105) of the electronic device 100 can, for example, identify the object as one of a side view of a face of an authorized user 405 or an ear of the authorized user 405. In one or more embodiments, the one or more processors (105) of the electronic device 100 can further detect skin tone color, which can impact source absorption of laser or infrared pulses emitted by the depth imager (116). Additionally, where a plurality of images of the object are captured, the one or more processors (105) of the electronic device 100 can confirm, from the plurality of images, that the object is approaching the electronic device 100, and so forth. Other explanatory factors that can be detected include whether some of the movement was against a direction of gravity, an orientation of the electronic device 100 at the end of the movement, and an acceleration occurring during the movement. These factors can be used individually or in combination.

Additionally, step 403 can include detecting that the object, which in this case is the head 408 of the authorized user 405 as shown at step 404, is within a predefined distance 409 of the electronic device 100. As was the case in FIG. 3, in one or more embodiments the three-dimensional imager, operating in its high-power mode of operation, can deliver time of flight laser or infrared pulses that reflect off the head 408 of the authorized user 405. By detecting the amount of time this reflection takes, the three-dimensional imager can determine the distance separating the head 408 of the authorized user 405 and the electronic device 100 at step 404.

The optional factors detected in FIG. 4, along with the factors detected in FIG. 3, can then be used to control the operation of the electronic device 100. Turning now to FIG. 5, when the incoming communication 302 is initially being received by the electronic device 100, the three-dimensional imager 501 is operating in its high-power mode 502 of operation. In the high-power mode of operation, infrared or laser pulses from the three-dimensional imager 501 transmit across a farther transmission range than when the three-dimensional imager 501 is operating in a low-power mode 503 of operation.

At step 504, one or more of the factors detected in FIGS. 3 and 4 are detected. These factors can include one or more of the detection of an electronic communication operation occurring, the detection of a gesture lifting the electronic device 100, the detection of an object approaching the electronic device 100, the detection of an object being within a predefined distance of the electronic device 100, the authentication of an authorized user, whether a side view of a face is captured in an image, whether a view of an ear is captured in an image, and so forth as previously described. Other factors will be obvious to those of ordinary skill in the art having the benefit of this disclosure.

When one or more of these factors occurs, as shown at step 505, in one or more embodiments the one or more processors (105) thereafter transition the three-dimensional imager 501 from the high-power mode 502 of operation to the low-power mode 503 of operation. In the low-power mode 503 of operation, infrared or laser pulses from the three-dimensional imager 501 transmit across a shorter transmission range than when the three-dimensional imager 501 is operating in a high-power mode 502 of operation. Consequently, the three-dimensional imager 501 transitions from its depth-scanning mode of operation to its proximity-sensing mode of operation.

Thus, in one or more embodiments step 505 comprises when, both the electronic communication operation is occurring and an object is approaching the electronic device, and further when the object is located within the first distance of the electronic device, transitioning the three-dimensional imager 501 from the high-power mode 502 of operation to the low-power mode 503 of operation. Step 505 can also include disabling a touch sensor of a touch-sensitive display 104 of the electronic device 100, as shown.

In another embodiment, step 505 comprises, when the gesture lifting the electronic device 100 is detected and both the electronic communication operation is occurring, and the object is located within the first distance of the electronic device 100, transitioning the three-dimensional imager 501 or depth imager of the electronic device 100 from a high-power mode 502 of operation to a low-power mode 503 of operation. Step 505 can also include turning OFF a touch sensor of a touch-sensitive display 104 of the electronic device 100.

In another embodiment, step 505 comprises transitioning the three-dimensional imager 501 from the high-power mode 502 of operation to the low-power mode 503 of operation, but only when a two-dimensional imager of the electronic device captures an image of a side of a face. Step 505 can also include disabling a touch sensor or display when the object is within the first distance of the electronic device 100.

In other embodiments, rather than transitioning the three-dimensional imager 501 from the high-power mode 502 of operation to the low-power mode 503 of operation, the three-dimensional imager 501 sampling gets reduced. For example, the operating mode of the pixels sampled in the three-dimensional imager 501 can transition from a Video Graphics Array (VGA) sampling to a Quarter-Video Graphics Array (QVGA). Where this technique is used, instead of transitioning the three-dimensional imager 501 from the low-power mode of operation to the high-power mode of operation, it would revert from QVGA sampling to VGA sampling.

At step 506, the electronic device 100 can detect, with the depth imager, the object moving beyond a second distance from the electronic device 100. This can be performed by executing the steps of FIG. 4 in reverse in one or more embodiments. Step 506 can include the one or more processors (105) of the electronic device 100 detecting, with the three-dimensional imager 501, the object moving beyond a second distance from the electronic device. At step 507, the one or more processors (105) of the electronic device 100 can thereafter transition the depth imager from the low-power mode of operation to the high-power mode of operation.

Thus, as shown in FIGS. 3-5, embodiments of the disclosure can use a three-dimensional imager 501 or depth imager, operating as a proximity sensor, to detect a user's face being within a predefined distance (409) of the electronic device, such as less than two inches. When this occurs and an incoming communication is being received, the one or more processors (105) of the electronic device 100 can disable the display 104 and its corresponding touch sensor. Once the call ends, i.e., the electronic communication operation ceases, and the electronic device separates from the face by another predefined distance, the signal emitter of the three-dimensional imager 501 or depth imager can revert back to "high power," which means that its transmission distance returns to the first transmission range from the second transmission range. These two distances can be different to establish hysteresis. This is shown in FIG. 6.

Figure 6:
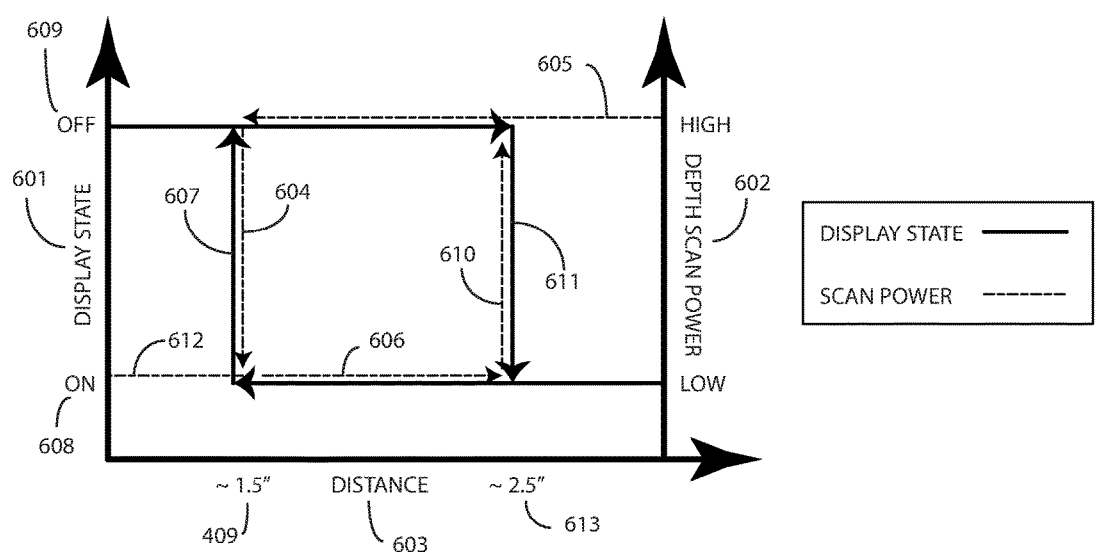
FIG. 6 illustrates electronic device component outputs in accordance with one or more embodiments of the disclosure.

Turning now to FIG. 6, illustrated therein is a display state 601 and a depth scan power of a three-dimensional imager or depth imager, versus distance, 603, in accordance with one or more embodiments of the disclosure. As described above, in one or more embodiments one or more processors (105) of an electronic device (100) can detect, with a wireless communication circuit (107), the receipt or transmission of an electronic communication (302). In one or more embodiments, the one or more processors (105) of an electronic device (100) can also detect, with one or more sensors, an object, e.g., a user's head (408) located within a first distance 409 from the electronic device (100).

As shown in FIG. 6, in one or more embodiments the one or more processors (105) of an electronic device (100) thereafter transition 604 the three-dimensional imager or depth imager from a high-power mode of operation 605 to a low-power mode of operation 612. Additionally, the one or more processors (105) of an electronic device (100) can disable a touch-sensitive display, which can include ceasing the presentation of visual output (as shown at step 505 in FIG. 5) and/or disabling a touch sensor of the touch-sensitive display by transitioning 607 one or both of the display and the touch sensor from a first state 608 to a second state 609.

However, when the one or more processors (105) of an electronic device (100) further detect, with the three-dimensional imager or depth imager in one or more embodiments, the object moving beyond a second distance 613 from the electronic device (100), the one or more processors (105) of an electronic device (100) can thereafter transition 610 the three-dimensional imager or depth imager from the low-power mode of operation 612 to the high-power mode of operation 605. Additionally, the one or more processors (105) of an electronic device (100) can optionally transition 611 the display and/or touch sensor from the second state 609 to the first state 608.

In one or more embodiments, to create hysteresis, the first distance 409 is less than the second distance 613. Said differently, the second distance 613 is greater than the first distance 409 in one or more embodiments. In one embodiment, the second distance 613 is at least fifty-percent greater than the first distance 409. For example, the second distance 613 might be two and a half inches, while the first distance 409 is one and a half inches.

The reverse could also occur. For example, the second distance 613 could be less than the first distance 409 to still create a hysteretic effect in one or more embodiments. In one embodiment, the second distance 613 is at least fifty-percent less than the first distance 409. For example, the second distance 613 might be one inch, while the first distance 409 is three inches, and so forth. Other differences between the first distance 409 and the second distance 613 will be obvious to those of ordinary skill in the art having the benefit of this disclosure.

Accordingly, embodiments of the disclosure are operable to detect an electronic communication operation context, one example of which is an incoming voice communication. Embodiments of the disclosure can then detect pre-placement of the electronic device against the face of the user. As noted, this can be detected using motion detection, images, and depth measurements. Where placement of the electronic device against—or near—the face occurs, the one or more processors can disable the touch sensor and/or display presentation function.

The transmission distance of the depth imager can also switch between the first transmission range and the second transmission range. In one or more embodiments, this occurs with hysteresis. For example, when the electronic device comes within one and a half inches of the user's face, in one or more embodiments the signal emitter of the depth imager switches from the first transmission range to the second transmission range. However, when the electronic device separates from the user's face, it may need to move a second distance, different from the first, such as about two and a half inches, for the one or more processors to cause the signal emitter to transition from the second transmission range to the first transmission range. Other operations will be described below. Still others will be obvious to those of ordinary skill in the art having the benefit of this disclosure.

Figure 7:
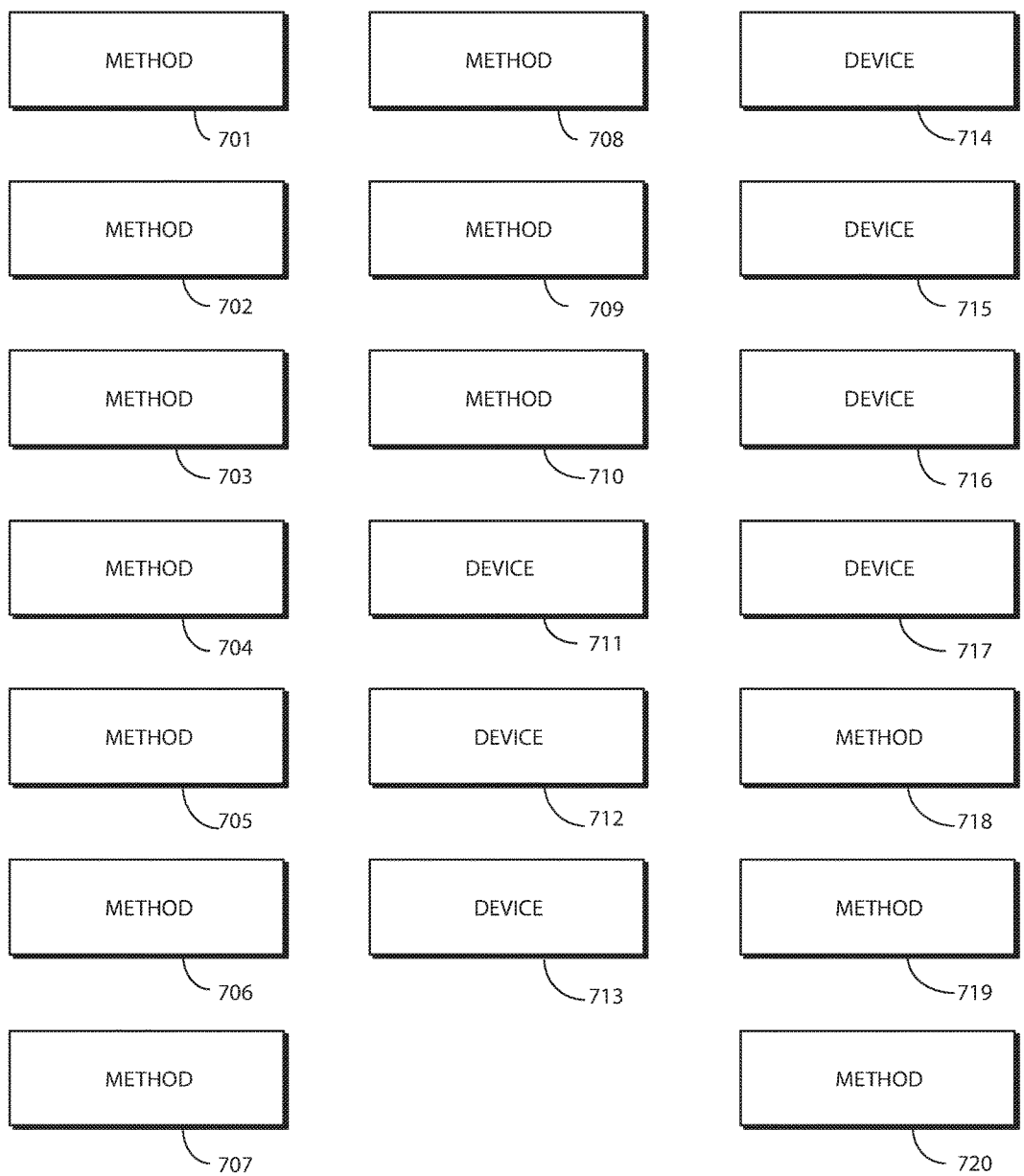
FIG. 7 illustrates one or more embodiments of the disclosure.

Turning now to FIG. 7, illustrated therein are various embodiments of the disclosure. At 701, a method in an electronic device comprises detecting, with one or more processors, an electronic communication operation occurring. At 701, the method comprises detecting, with a depth imager operable with the one or more processors, an object approaching the electronic device. At 701, when both the electronic communication operation is occurring and the object is approaching the electronic device, the method can include causing a signal emitter of the depth imager of the electronic device to reduce a transmission distance from a first transmission range to a second transmission range. Thereafter, the method of 701 can include detecting, with the depth imager, the object located within a first distance of the electronic device, and where the object is located within the first distance of the electronic device, disabling a touch sensor of a touch-sensitive display of the electronic device.

At 702, the method of 701 further comprises ceasing a presentation of visual output by the touch-sensitive display. At 703, the electronic communication operation of 701 comprises one of a commencement or an occurrence of one of a receipt of an incoming electronic communication or a transmission of an outgoing electronic communication. In another embodiment, at 703 the method of 701 further comprises detecting a skin tone color of the object, wherein the second transmission range is a function of the skin tone color.

At 704, the method of 703 comprises detecting a gesture lifting the electronic device. At 705, the method of 703 further comprises capturing, with an imager, a plurality of images of the object, confirming, from the plurality of images, that the object is approaching the electronic device, and identifying, with the one or more processors, the object as one of a side view of a face of an authorized user or an ear of the authorized user. At 705, the method of 703 can further include detecting skin tone color, which can impact source absorption of laser or infrared pulses emitted by the depth imager. This additional information can further be used in calibrating and/or setting the right amount of depth imager source power when the electronic device is about to reach the face of a user. Accordingly, as noted above, the power with which the depth imager is driven or the distance of the second transmission range can be set as a function of the skin tone color, with lighter skin tones having an increased power with which the depth imager is driven or shorter distance of the second transmission range, and darker skin tone colors having higher power with which the depth imager is driven or longer distances of the second transmission range.

At 706, the method of 705 further comprises detecting a gesture lifting the electronic device. At 706, the capturing the image occurring at 705 occurs in response to the detecting the gesture lifting the electronic device.

At 707, the method of 703 further comprises detecting, with the depth imager, the object moving outside a second distance from the electronic device. At 707, and after the object moves outside the second distance from the electronic device, the method of 703 comprises causing the signal emitter of the depth imager of the electronic device to increase the transmission distance from the second transmission range to the first transmission range. At 708, the method of 707 further comprises turning ON the touch sensor of the touch-sensitive display of the electronic device.

At 709, the method of 707 further comprises resuming the presentation of the visual output by the touch-sensitive display. At 710, the second distance of 707 is greater than the first distance.

At 711, an electronic device comprises a wireless communication circuit, a three-dimensional imager, and one or more processors operable with the three-dimensional imager. At 711, the one or more processors detect, with the wireless communication circuit, receiving or transmitting an electronic communication. At 711, the one or more processors also detect, with one or more sensors, an object located within a first distance the electronic device. At 711, the one or more processors thereafter transition the three-dimensional imager from a high-power mode of operation to a low-power mode of operation.

In other embodiments at 711, rather than transitioning the three-dimensional imager from the high-power mode of operation to the low-power mode of operation, the three-dimensional imager sampling gets reduced. For example, the operating mode of the pixels sampled in the three-dimensional imager can transition from a VGA sampling to a QVGA. Where this technique is used, instead of transitioning the three-dimensional imager from the low-power mode of operation to the high-power mode of operation, it would revert from QVGA sampling to VGA sampling At 712, the one or more processors of 711 further detect, with the three-dimensional imager, the object moving beyond a second distance from the electronic device. At 712, the one or more processors thereafter transition the three-dimensional imager from the low-power mode of operation to the high-power mode of operation. At 713, the second distance of 712 is at least fifty percent greater than the first distance.

At 714, the electronic device of 711 further comprises a display and a touch sensor operable with the display. At 712, the one or more processors further disable the touch sensor when the object is within the first distance of the electronic device.

At 715, the electronic device of 711 further comprises one or more motion sensors. At 715, the one or more processors of the electronic device of 711 transition the three-dimensional imager from the high-power mode of operation to the low-power mode of operation only when the one or more motion sensor detect a gesture lifting the electronic device.

At 716, the electronic device of 711 further comprises a two-dimensional imager. At 716, the one or more processors transition the three-dimensional imager from the high-power mode of operation to the low-power mode of operation only when the two-dimensional imager captures an image of a side of a face.

At 717, a method in an electronic device comprises detecting, with one or more processors, an electronic communication operation occurring. At 717, the method comprises detecting, with a motion sensor operable with the one or more processors, a gesture lifting the electronic device. At 717, the method comprises detecting, with a depth imager, an object located within a first distance the electronic device. At 717, when the gesture lifting the electronic device is detected and both the electronic communication operation is occurring and the object is located within the first distance of the electronic device, the method comprises transitioning the depth imager of the electronic device from a high-power mode of operation to a low-power mode of operation.

At 718, the method of 717 comprises turning OFF a touch sensor of a touch-sensitive display of the electronic device. At 719, the method of 718 further comprises detecting, with the depth imager, the object moving beyond a second distance from the electronic device, and thereafter transitioning the depth imager from the low-power mode of operation to the high-power mode of operation. At 720, the second distance of 719 is greater than the first distance.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:

detecting, with one or more processors, an electronic communication operation occurring;

detecting, with a depth imager operable with the one or more processors, an object approaching the electronic device;

thereafter detecting, with the depth imager, the object located within a first distance of the electronic device; and where the electronic communication operation is occurring, the object is approaching the electronic device, and the object is located within the first distance of the electronic device, transitioning the depth imager from a high-power mode of operation to a low-power mode of operation by causing a signal emitter of the depth imager to reduce a transmission distance from a first transmission range to a second transmission range, and disabling a touch sensor of a touch-sensitive display of the electronic device.

2. The method of claim 1, further comprising ceasing a presentation of visual output by the touch-sensitive display.

3. The method of claim 1, further comprising detecting a skin tone color of the object.

4. The method of claim 3, further comprising detecting a gesture lifting the electronic device.

5. The method of claim 3, further comprising:
capturing, with an imager, a plurality of images of the object;
confirming, from the plurality of images, that the object is approaching the electronic device; and
identifying, with the one or more processors, the object as one of a side view of a face of an authorized user or an ear of the authorized user.

6. The method of claim 5, further comprising detecting a gesture lifting the electronic device, wherein the capturing the image occurs in response to the detecting the gesture lifting the electronic device.

7. The method of claim 3, further comprising:
detecting, with the depth imager, the object moving outside a second distance from the electronic device; and
after the object moves outside the second distance from the electronic device, causing the signal emitter of the depth imager of the electronic device to increase the transmission distance from the second transmission range to the first transmission range.

8. The method of claim 7, further comprising turning ON the touch sensor of the touch-sensitive display of the electronic device.

9. The method of claim 7, further comprising resuming the presentation of the visual output by the touch-sensitive display.

10. The method of claim 7, wherein the second distance is greater than the first distance.

11. An electronic device, comprising:
a wireless communication circuit;
a three-dimensional imager; and
one or more processors operable with the three-dimensional imager;
the one or more processors detecting, with the wireless communication circuit, receiving or transmitting an electronic communication, and also detecting, with one or more sensors, an object located within a first distance the electronic device;
the one or more processors thereafter transitioning the three-dimensional imager from a high-power mode of operation to a low-power mode of operation.

12. The electronic device of claim 11, the one or more processors further detecting, with the three-dimensional imager, the object moving beyond a second distance from the electronic device, and thereafter transitioning the three-dimensional imager from the low-power mode of operation to the high-power mode of operation.

13. The electronic device of claim 12, wherein the second distance is at least fifty percent greater than the first distance.

14. The electronic device of claim 11, further comprising a display and a touch sensor operable with the display, the one or more processors further disabling the touch sensor when the object is within the first distance of the electronic device.

15. The electronic device of claim 11, further comprising one or more motion sensors, the one or more processors transitioning the three-dimensional imager from the high-power mode of operation to the low-power mode of operation only when the one or more motion sensor detect a gesture lifting the electronic device.

16. The electronic device of claim 11, further comprising a two-dimensional imager, the one or more processors transitioning the three-dimensional imager from the high-power mode of operation to the low-power mode of operation only when the two-dimensional imager captures an image of a side of a face.

17. A method in an electronic device, the method comprising:
detecting, with one or more processors, an electronic communication operation occurring;
detecting, with a motion sensor operable with the one or more processors, a gesture lifting the electronic device; and
detecting, with a depth imager an object located within a first distance the electronic device;
when the gesture lifting the electronic device is detected and both the electronic communication operation is occurring and the object is located within the first distance of the electronic device, transitioning the depth imager of the electronic device from a high-power mode of operation to a low-power mode of operation.

18. The method of claim 17, further comprising turning OFF a touch sensor of a touch-sensitive display of the electronic device.

19. The method of claim 18, further comprising detecting, with the depth imager, the object moving beyond a second distance from the electronic device, and thereafter transitioning the depth imager from the low-power mode of operation to the high-power mode of operation.

20. The electronic device of claim 19, wherein the second distance is greater than the first distance.

* * * * *